United States Patent [19]

Seifert et al.

[11] 4,048,974
[45] Sept. 20, 1977

[54] EXTERNALLY IGNITED FOUR CYCLE GAS ENGINE

[75] Inventors: Hans Seifert; Kurt Will, both of Augsburg; Horst Zapf, Steppach, all of Germany

[73] Assignee: Maschinenfabrik Augsburg-Nurnberg AG, Nurnberg, Germany

[21] Appl. No.: 669,266

[22] Filed: Mar. 22, 1976

[30] Foreign Application Priority Data

Mar. 20, 1975 Germany .............................. 2512218

[51] Int. Cl.$^2$ ............................................. F02B 23/00
[52] U.S. Cl. ........................ 123/191 M; 123/191 SP; 123/191 R
[58] Field of Search ................. 123/30 C, 32 C, 32 K, 123/32 SP, 191 R, 191 B, 191 C, 191 M, 191 S, 191 SP, 193 R, 193 CH, 193 CP, 193 H

[56] References Cited

U.S. PATENT DOCUMENTS

| 2,699,160 | 1/1955 | McDuffie | 123/191 M |
| 2,749,899 | 6/1956 | Mitchell | 123/191 M |
| 2,749,900 | 6/1956 | Mitchell | 123/191 M |
| 2,749,901 | 6/1956 | Mitchell | 123/191 M |
| 2,800,123 | 7/1957 | Fisher | 123/191 M |
| 2,826,184 | 3/1958 | McDuffie | 123/191 M |
| 3,520,289 | 7/1970 | Hoffmann | 123/193 H |

FOREIGN PATENT DOCUMENTS

| 449,180 | 6/1936 | United Kingdom | 123/32 B |
| 971,519 | 9/1964 | United Kingdom | 123/191 S |
| 1,003,257 | 9/1965 | United Kingdom | 123/191 S |

Primary Examiner—Carroll B. Dority, Jr.
Assistant Examiner—William Randolph
Attorney, Agent, or Firm—Walter Becker

[57] ABSTRACT

An external auto-ignited four stroke cycle gas engine with a combustion chamber which is arranged in the piston rotation symmetrically with regard to the cylinder axis and which in the upper dead center point of the piston absorbs nearly the total gas-air mixture. The engine, furthermore, includes means for imparting turbulence upon the gas-air mixture about the longitudinal cylinder axis, and also has a trough which is arranged in the cylinder head, and into which a spark plug extends. The combustion chamber in the form of a truncated cone open and widening toward the cylinder head has a substantially plane bottom while the greatest diameter of this truncated cone-shaped combustion chamber equals from 55 to 70% of the piston diameter and the depth of this combustion chamber is in a range from 15 to 20% of the piston diameter. The mantle surface of the combustion chamber is at an angle of from 10° to 30° inclined relative to the longitudinal axis of the cylinder. The trough into which the spark plug extends is truncated cone shaped and located entirely above the opening of the combustion chamber. The greatest diameter of the trough amounts to about twice the diameter of the thread of the spark plug while the depth of the trough amounts to from 20 to 25% of the trough diameter. Adjacent to and communicating with the trough is an ignition passage which ends in a tip at the longitudinal cylinder axis.

7 Claims, 2 Drawing Figures

EXTERNALLY IGNITED FOUR CYCLE GAS ENGINE

The present invention relates to an external auto-ignited four-stroke cycle gas engine with a combustion chamber which is arranged in the piston rotation-symmetrically with regard to the cylinder axis and which in the upper piston dead center point absorbs approximately the entire gas-air mixture, the gas engine being provided with means for generating turbulence of the gas-air mixture about the cylinder axis and furthermore being provided with a depression provided in the cylinder head while an ignition plug extends into this depression.

It is an object of the present invention to provide an engine of this type which in spite of the fact that its exhaust gases are substantially free from harmful components has a low fuel consumption and a high output.

This object and other objects and advantages of the invention will appear more clearly from the following specification in connection with the accompanying drawing, in which.

INTRODUCTION

The four-stroke cycle gas engine according to the present invention is characterized primarily in that the combustion chamber is designed in the form of a truncated cone with a plane bottom or level bottom; the truncated cone widens toward the cylinder head. The greatest diameter of the truncated cone-shaped combustion chamber amounts to about from 55 to 70% of the piston diameter while its depth amounts to about from 15 to 20% of the piston diameter. The mantle surface of the truncated cone is relative to the longitudinal axis of the cylinder increased at an angle of from 10° to 30°. The ignition plug depression is truncated cone-shaped and is arranged completely outside the combustion chamber opening. The largest diameter of the ignition plug depression at least approximately equals twice the diameter of the thread for the ignition plug while the depth of the depression amounts to about from 20 to 25% of its diameter and the depression is followed by a wedge-shaped ignition passage the tip of which ends flat with regard to the cylinder center.

The application of the present invention will result not only in a high compression which is an important factor in the realization of a low fuel consumption and a high output, but it is also possible by means of the present invention to obtain a proper combustion. The engine can be driven with a high excess of air and late ignition so that very clean exhaust gases will be obtained.

DETAILED DESCRIPTION

Figure 1:
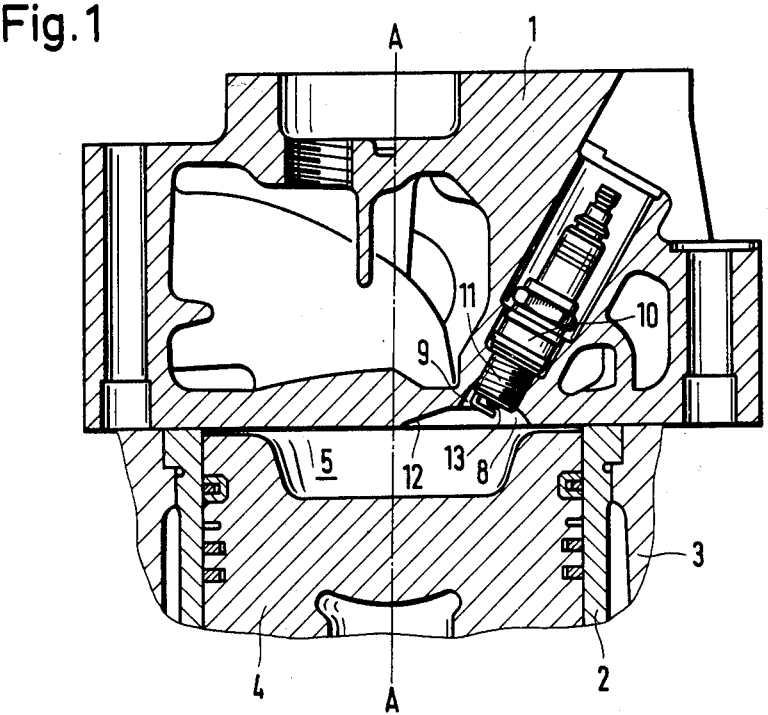
FIG. 1 illustrates a fragmentary section through an engine according to the invention.
Figure 2:
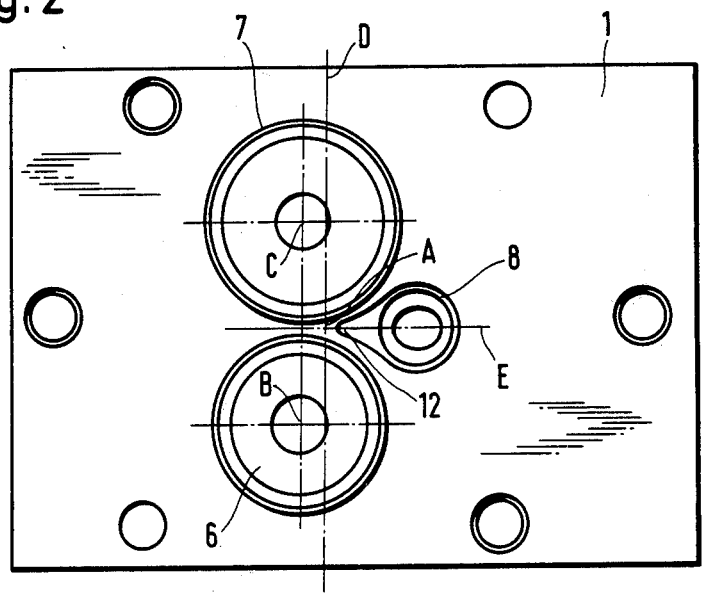
FIG. 2 is a bottom view of the cylinder head of FIG. 1.

Referring now to the drawing in detail, the engine shown therein comprises a cylinder head 1 which is firmly connected to a motor housing 3 which receives the cylinder bushing or lining 2. A piston 4 with a combustion chamber 5 is reciprocable in the cylinder bushing 2. The combustion chamber 5 has the shape of a truncated cone that widens toward the cylinder head 1. The largest diameter of the truncated cone which is adjacent the cylinder head 1 amounts to about 67% of the diameter of the piston 4. The mantle surface of the truncated cone-shaped combustion chamber 5 is inclined at an angle of about 15° with regard to the longitudinal axis A—A of the cylinder. The depth of the combustion chamber amounts to about 17% of the diameter of the piston 4. In order to avoid the formation of tears, the merging areas at the ends of the mantle surface of combustion chamber 5 are rounded. The arrangement is furthermore so selected that the combustion chamber 5 will in the upper dead center point of the piston which is illustrated in FIG. 1 approximately receive the total gas-air mixture. The volume of the combustion chamber 5 is furthermore so selected that, when the engine is driven with liquid gas, a compression ratio of from 1:10 to 1:12 is obtained. If the engine is driven with earth gas, the compression ratio may be fixed as from 1:13 to 1:15. With these compression ratios, the engine can be operated without the danger of encountering knocking of the engine.

The cylinder head 1 has an inlet valve 7 and an outlet valve 6 which has a somewhat smaller diameter than that of inlet valve 7. The longitudinal axes B and C of the two valves 6 and 7 are arranged in an offset manner toward one side relative to a plane D which passes through the longitudinal axis A of the cylinder. The inlet passage arranged in the cylinder head 1 and leading to the inlet valve 7 is in a manner known per se designed as an arched swirl passage. As a result thereof, the gas-air mixture which is introduced into the combustion chamber 5 is subjected to a twist so that it will circulate within the cylinder bushing 2 about the axis A—A. The swirl or twist passage is so designed that the gas-air mixture will at a cylinder diameter of about from 100 to 150 mm circulate at about 160 to 180 rpm.

Instead of using the swirl passage, the swirling of the gas-air mixture about the longitudinal cylinder axis A—A may also be generated by means of a valve with deflector known per se.

There is furthermore provided in the cylinder head a depression 8 which is likewise truncated-cone-shaped and which is completely arranged above the opening of the combustion chamber 5. A bore 9 which receives the ignition plug 10 leads into the depression 8. The greatest diameter of depression 8 equals approximately twice the diameter of the thread 11 of the ignition plug 10. The depth of the depression 8 amounts to about 22% of its diameter. Expediently, the ignition plug 10 is so arranged that the shorter electrode 13 ends approximately in a plane which passes through the bottom of the depression 8. The depression 8 is arranged on that side of plane D which is located opposite the longitudinal axes B, C of the valves 6, 7. The shortest distance between the rim of the depression 8 and the seat of the valves 6, 7 approximately equals the shortest distance between the two seats of the valves 6, 7. In addition thereto, the center of the depression 8 is arranged in a plane E which is perpendicular to the plane D and passes through the center of the shortest distance between the seats of the two valves 6, 7. In the direction toward the longitudinal axis A—A of the cylinder, the depression 8 is followed by an ignition passage 12. The ignition passage 12 which is open toward the combustion chamber 5 is in plan view wedge-shaped. At the same time, as shown in FIG. 1, the tip of the ignition passage 12 ends flat toward the center of the cylinder.

When during the operation of the engine the gas-air mixture passes through the inlet passage and the opened inlet valve into the cylinder bushing 2, the inlet passage designed as swirl passage brings about a rotation of the mixture about the longitudinal axis A-A of the cylinder. During a further upward stroke of the piston, the marginal area of the piston forms outside the combustion chamber 5 together with the bottom side of the cylinder head 1 a compression or squeeze gap (Quetschspalt) which in addition to the turbulence movement imposes upon the mixture a component of movement pointing in the direction toward the longitudinal axis A-A of the cylinder. This last mentioned component brings about a concentration of the mixture within the region of the center of the combustion chamber and thereby avoids the danger that the specifically heavier air particles are by the strong turbulence centrifuged outwardly toward the outer rim of the combustion chamber. The depression 8 which receives the electrodes of the ignition plug 10 will make sure that due to the strong turbulence of the gas-air mixture in the combustion chamber 5 the ignition spark will neither be prematurely extinguished nor blown away. On the other hand, due to the selected flat dimensioning of the depression 8, it will be assured that this depression will during the gas change still be well rinsed.

As soon as the ignition spark jumps over, the mixture in the depression 8 ignites. Due to the arrangement of the depression 8 above the combustion chamber opening and the ignition passage 12, it will be assured that the flame of the ignited mixture passes as quickly as possible to the center of the combustion chamber 5 where it ignites the there present mixture. The selected depth dimension of the combustion chamber 5 will assure that the mixture in the combustion chamber 5 will relatively quickly be ignited all the way to the bottom. The inclined mantle surface of the combustion chamber 5 will assure that the flames which from the center of the combustion chamber impact upon the mantle surface will be deviated to such an extent that they enter directly into the annular gap which forms between the marginal area of the downwardly moving piston 4 and the cylinder heat 1 so that also the here prevailing gas-air mixture will uniformly and quickly be ignited. Due to the selected shape and dimension of the chamber in which the combustion occurs so that the chamber is closed as far as possible and is free from crevices, the compression ratio can be selected to be at a high value. A high compression ratio in turn contributes to the acceleration of the igniting throughout the entire mixture.

A further advantage of the design according to the invention consists in that the engine can be operated at a relatively late ignition in order to avoid high process temperature which in turn favors the formation of nitrous oxides (Stickoxyde).

Furthermore, the spark plug remains relatively cold in view of its setback position. The position of the spark plug permits the use of a slight electrode distance which in its turn brings about an extension of the time of operation of the spark plug.

It is, of course, to be understood that the present invention is, by no means, limited to the specific showing in the drawing but also comprises any modifications within the scope of the appended claims.

What we claim is:

1. An external auto-ignited four stroke cycle gas engine which includes: a cylinder, a piston reciprocable in said cylinder, a piston head mounted on and connected to said cylinder, said piston having that end thereof which faces said cylinder head provided with a truncated cone-shaped combustion chamber having a substantially flat bottom and widening and opening toward said cylinder head and being adapted in the upper dead center position of said piston to take in nearly the total gas-air mixture supplied per cycle to said cylinder, said cylinder head being provided with inlet valve means for admission of a gas-air mixture, means provided in said cylinder for imparting turbulence upon the gas-air mixture being admitted through said inlet valve means, said cylinder head also being provided with a truncated cone-shaped trough arranged completely in said cylinder head and communicating with said combustion chamber, a spark plug provided with a connecting thread and extending into said trough, the greatest diameter of said combustion chamber amounting to from about 55 to 70% of the diameter of said piston, and the depth of said combustion chamber equalling from about 15 to 20% of the diameter of said piston while the mantle surface of said combustion chamber is inclined at an angle of from 10° to 30° relative to the longitudinal axis of said cylinder, the greatest diameter of said trough equalling about twice the diameter of said connecting thread of said spark plug, and the depth of said trough amounting to from about 20 to 25% of the diameter of said trough, and wedge-shaped ignition passage means extending from said trough toward the longitudinal axis of said cylinder while tapering toward said last mentioned axis so that the tip of said taper ends flat at said cylinder axis.

2. An engine according to claim 1, in which said cylinder head is also provided with an exhaust outlet valve, and in which the central axes of said inlet and outlet valves are offset in the same direction relative to the vertical longitudinal axis of said cylinder, said trough being offset to said last mentioned cylinder axis in a direction opposite to said first mentioned direction.

3. An engine according to claim 2, in which the center of said through is located in a plane extending through the center of the shortest distance between said inlet and outlet valves and forming the longitudinal plane of symmetry of said trough.

4. An engine according to claim 2, in which each of said inlet and outlet valves respectively has associated therewith a valve seat, and in which the shortest distance between the rim of said trough and each of said two valve seats approximately equals the shortest distance between said two valve seats.

5. An engine according to claim 1, in which said spark plug has two electrodes of different length, and in which the shorter electrode ends in a plane passing about through the bottom of said trough.

6. An engine according to claim 1, which when employing liquid gas has a compression ratio of 10-12.

7. An engine according to claim 1, which when employing earth gas has a compression ratio of about 13-15.

* * * * *